US009953393B2

(12) United States Patent
Marmin et al.

(10) Patent No.: US 9,953,393 B2
(45) Date of Patent: Apr. 24, 2018

(54) ANALYZING METHOD AND ANALYZING SYSTEM FOR GRAPHICS PROCESS OF GRAPHIC APPLICATION PROGRAM

(71) Applicant: INDUSTRIAL TECHNOLOGY RESEARCH INSTITUTE, Hsinchu (TW)

(72) Inventors: Arthur Marmin, Hsinchu (TW); Chun-Hung Lai, Taichung (TW); Hsun-Lun Huang, Taichung (TW); Juin-Ming Lu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 44 days.

(21) Appl. No.: 14/983,494

(22) Filed: Dec. 29, 2015

(65) Prior Publication Data
US 2017/0140495 A1 May 18, 2017

(30) Foreign Application Priority Data
Nov. 13, 2015 (TW) .............................. 104137577 A

(51) Int. Cl.
| G06T 1/20 | (2006.01) |
| G06F 11/36 | (2006.01) |
| G06K 9/00 | (2006.01) |

(52) U.S. Cl.
CPC ............ *G06T 1/20* (2013.01); *G06F 11/3664* (2013.01); *G06K 9/00* (2013.01)

(58) Field of Classification Search
CPC ............. G06T 1/20; G06T 2207/20081; G06T 2207/20084; G06F 15/18; G06F 19/24;
(Continued)

(56) References Cited

U.S. PATENT DOCUMENTS 7,426,320 B2    9/2008  Stevens
8,527,239 B2    9/2013  Sowerby et al.
(Continued)

FOREIGN PATENT DOCUMENTS

CN    102893675 A    1/2013
TW    200519730 A    6/2005
(Continued)

OTHER PUBLICATIONS

Bailey et al., Adaptive Configuration Selection for Power-Constrained Heterogeneous Systems Parallel Processing (ICPP), 2014 43rd International Conference, Sep. 2014, pp. 371-380.*
(Continued)

*Primary Examiner* — Mark K Zimmerman
*Assistant Examiner* — Phuc N Doan
(74) *Attorney, Agent, or Firm* — Rabin & Berdo, P.C.

(57) ABSTRACT

An analyzing method and an analyzing system for graphics process are provided. The analyzing method includes the following steps. A graphics application program is provided and a plurality of graphics parameters of the graphics application program are obtained. The graphics application program is classified to be at least one of a plurality of groups according to the graphics parameters. A plurality weighting coefficients are obtained. A total loading of a graphics processing unit for performing the graphics application program is calculated according to the weighting coefficients and the graphics parameters.

20 Claims, 5 Drawing Sheets

(58) Field of Classification Search
CPC ... G06F 19/707; G05B 13/00; G05B 13/0255; G05B 13/047
See application file for complete search history.

(56) References Cited

U.S. PATENT DOCUMENTS

| | | | |
|---|---|---|---|
| 2005/0100209 A1* | 5/2005 | Lewis | G06K 9/6217 382/159 |
| 2005/0197977 A1* | 9/2005 | Buck | G06F 17/16 706/12 |
| 2006/0080076 A1 | 4/2006 | Lahiri et al. | |
| 2007/0047802 A1* | 3/2007 | Puri | G06K 9/4628 382/157 |
| 2007/0050603 A1 | 3/2007 | Vorbach et al. | |
| 2007/0220292 A1 | 9/2007 | Ishihara et al. | |
| 2009/0002379 A1 | 1/2009 | Baeza et al. | |
| 2009/0309885 A1 | 12/2009 | Samson et al. | |
| 2010/0083248 A1* | 4/2010 | Wood | G06F 9/5077 718/1 |
| 2010/0153654 A1 | 6/2010 | Vorbach et al. | |
| 2010/0211933 A1 | 8/2010 | Kiel et al. | |
| 2011/0016455 A1 | 1/2011 | Perry et al. | |
| 2011/0304634 A1* | 12/2011 | Urbach | G06F 9/5016 345/501 |
| 2012/0081373 A1 | 4/2012 | Li et al. | |
| 2012/0096244 A1* | 4/2012 | Zhang | G06F 17/18 712/222 |
| 2013/0024713 A1 | 1/2013 | Bajic et al. | |
| 2013/0127858 A1* | 5/2013 | Leroy | G06L 15/005 345/426 |
| 2013/0191612 A1* | 7/2013 | Li | G06T 15/005 712/30 |
| 2013/0211752 A1 | 8/2013 | Shi et al. | |
| 2013/0223727 A1* | 8/2013 | Jiang | G06K 9/6217 382/159 |
| 2014/0053009 A1 | 2/2014 | Semin | |
| 2014/0082383 A1 | 3/2014 | De Cesare et al. | |
| 2015/0100887 A1 | 4/2015 | Verkasalo | |
| 2015/0317563 A1* | 11/2015 | Baldini Soares | G06N 99/005 706/12 |
| 2016/0274636 A1* | 9/2016 | Kim | G06F 1/26 |
| 2016/0358305 A1* | 12/2016 | Banerjee | G06T 1/20 |

FOREIGN PATENT DOCUMENTS

| | | |
|---|---|---|
| TW | 1305900 B | 2/2009 |
| TW | 201346518 A | 11/2013 |
| TW | 201508480 A | 3/2015 |

OTHER PUBLICATIONS

Taiwanese Office Action dated May 17, 2016.
Gene Wu et al., "GPGPU Performance and Power Estimation Using Machine Learning", pp. 564-576, proceeded by High Performance Computer Architecture (HPCA), 2015 IEEE 21st International Symposium on Feb. 7-11, 2015.
Bren Mochocki et al., "Power Analysis of Mobile 3D Graphics", 3-9810801-0-6/DATE06 © 2006 EDAA, pp. 502-507, Design, Automation and Test in Europe, 2006. DATE '06. Proceedings (vol. 1 ), Mar. 6-10, 2006.
Shuaiwen Song et al., "A Simplified and Accurate Model of Power-Performance Efficiency on Emergent GPU Architectures", proceeded by 2013 IEEE 27th International Symposium on Parallel & Distributed Processing, pp. 673-686, May 20-24, 2013.
Cheng Luo et al., "A performance and energy consumption analytical model for GPU", proceeded by 2011 Ninth IEEE International Conference on Dependable, Autonomic and Secure Computing, pp. 658-665, Dec. 12-14, 2011.
Jarkko M. Vatjus-Anttila et al., "Power Consumption Model of a Mobile GPU Based on Rendering Complexity", proceeded by 2013 Seventh International Conference on Next Generation Mobile Apps, Services and Technologies, pp. 210-215, Sep. 25-27, 2013.
Jan Lucas et al., "How a Single Chip Causes Massive Power Bills GPUSimPow: A GPGPU Power Simulator", 978-1-4673-5779-1/13 © 2013 IEEE, pp. 97-106, proceeded by Performance Analysis of Systems and Software (ISPASS), 2013 IEEE International Symposium on Apr. 21-23, 2013.

* cited by examiner

ANALYZING METHOD AND ANALYZING SYSTEM FOR GRAPHICS PROCESS OF GRAPHIC APPLICATION PROGRAM

This application claims the benefit of Taiwan application Serial No. 104137577, filed Nov. 13, 2015, the disclosure of which is incorporated by reference herein in its entirety.

TECHNICAL FIELD

The disclosure relates in general to an analyzing method and an analyzing system for graphics process.

BACKGROUND

To satisfy the demand of meticulousness and gorgeousness, the graphics processing unit is widely used for drawing some 3D scenes. However, the battery capacity in a mobile device is limited. A program developer is needed to know the power consumption of the graphics processing unit when the 3D scenes are drawn. It is required to balance the performance, the representation of the 3D scene and the power consumption. The program developer could try to modify the graphics application program to optimize performance per unit of power consumption.

To estimate the power consumption of the graphics processing unit, the signal information or the states information of the hardware components are detected and used for estimating the power consumption. However, the signal information and the states information is based on the particular hardware architecture, and the supplier of the graphics processing unit may not provide the particular method and equipment for detecting the signal information and the states information. Moreover, the program developer cannot find out the particular block of program codes or the particular 3D scene which causes much power consumption.

Further, the above described problems are also happened on the estimation of the time consumption. The program developer cannot find out the particular block of program codes or the particular 3D scene which causes much time consumption.

SUMMARY

The disclosure is directed to an analyzing method and an analyzing system for graphics process.

According to one embodiment, an analyzing method for graphics process is provided. The analyzing method includes the following steps. A plurality of reference graphics application programs and a plurality of reference graphics parameters of each of the reference graphics application programs are provided. The reference graphics application programs are grouped into a plurality of groups. A classifying relationship between the reference application graphics application programs and the groups is trained according to the reference graphics parameters. A relative relationship between a plurality of loadings of a plurality of hardware components of a graphic processing unit and the reference graphics parameters is analyzed.

According to another embodiment, an analyzing method for graphics process is provided. A current graphics application program is provided. A plurality of current graphics parameters of the current graphics application program are obtained. The current graphics application program is classified to be at least one of a plurality of groups according to the current graphics parameters. A plurality of weighting coefficients is obtained. A total loading of a graphics processing unit for performing the current graphics application program is calculated according to the weighting coefficients and the current graphics parameters.

According to another embodiment, an analyzing system for graphics process is provided. The analyzing system includes a parameter capturing unit, a grouping unit, a classifier and a relative information unit. The parameter capturing unit is configured to capture a plurality of reference graphics parameters of each of a plurality of reference graphics application programs. The grouping unit is configured to group the reference graphics application programs into a plurality of groups. The classifier is configured to train a classifying relationship between the reference graphics application programs and the groups according to the reference graphics parameters. The relative information unit is configured to analyze a relative relationship between a plurality of loadings of a plurality of hardware components of a graphic processing unit and the reference graphics parameters.

According to another embodiment, an analyzing system for graphics process is provided. The analyzing system includes a parameter capturing unit, a classifier and a calculating unit. The parameter capturing unit is configured to obtain a plurality of current graphics parameters of a current graphics application program. The classifier is configured to classify the current graphics application program to be at least one of a plurality of groups according to the current graphics parameters and obtain a plurality of weighting coefficients. The calculating unit is configured to calculate a total loading of a graphics processing unit for performing the current graphics application program according to the weighting coefficients and the current graphics parameters.

Figure 1:
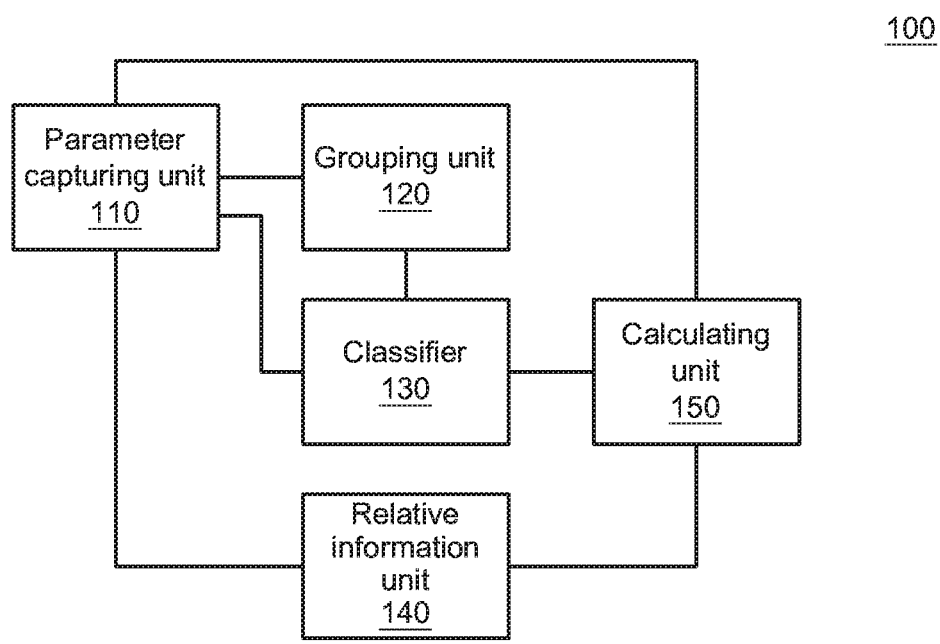
FIG. 1 shows an analyzing system for graphics process according to one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1. FIG. 1 shows an analyzing system 100 for graphics process according to one embodiment. The analyzing system 100 is used for analyzing varied graphics application programs to estimate a total loading of the graphics processing unit performing the graphics application programs. For example, the graphics processing unit may be an OpenGL ES 2.0 API Embedded GPU. This graphics processing unit is commonly used in Tile-Based Deferred Rendering (TBDR). Or, the graphics processing unit may be a DirectX GPU. The total loading of the graphic processing unit is the power consumption or the time consumption. In this embodiment, the program developer can improve the high loading graphics application program after analysis.

The analyzing system 100 includes a parameter capturing unit 110, a grouping unit 120, a classifier 130, a relative information unit 140 and a calculating unit 150. If the analyzing system 100 is performed at an offline mode, the parameter capturing unit 110, the grouping unit 120, the classifier 130 and the relative information unit 140 create an estimating model according to a plurality of reference graphics application programs. If the analyzing system 100 is performed at an online mode, the parameter capturing unit 110, the classifier 130, the relative information unit 140 and the calculating unit 150 analyze the current graphics application program to obtain the total loading of the graphics processing unit for performing the current graphics application program according to the estimating model.

Figure 2A:
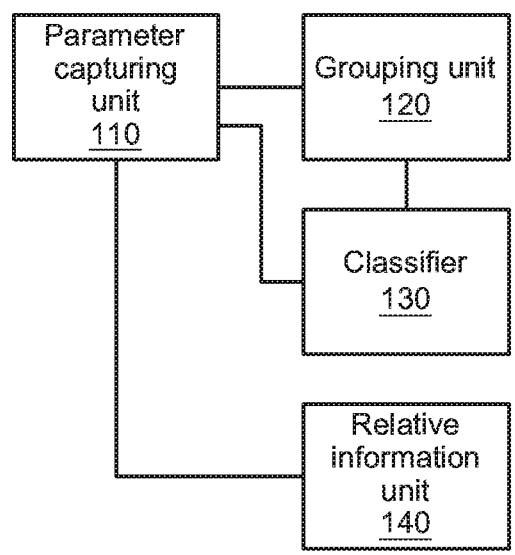
FIG. 2A shows an analyzing system for graphics process according another embodiment.
Figure 2B:
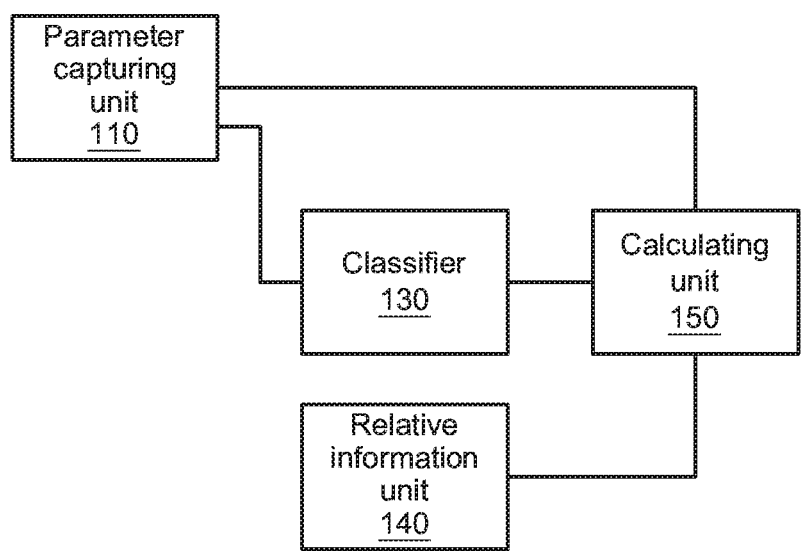
FIG. 2B shows an analyzing system for graphics process according to another embodiment.

Please refer to FIG. 2A. FIG. 2A shows an analyzing system 100A for graphics process according another embodiment. In one embodiment, the analyzing system 100A is specifically used in the offline mode, and includes the parameter capturing unit 110, the grouping unit 120, the classifier 130 and the relative information unit 140. Please refer to FIG. 2B. FIG. 2B shows an analyzing system 100B for graphics process according to another embodiment. In another embodiment, the analyzing system 100B is specifically used in the online mode, and includes the parameter capturing unit 110, the classifier 130, the relative information unit 140 and the calculating unit 150.

One or all of the parameter capturing unit 110, the grouping unit 120, the classifier 130, the relative information unit 140 and the calculating unit 150 can be a chip, a circuit, a circuit board, or a storage device storing a plurality of program codes.

Figure 3:
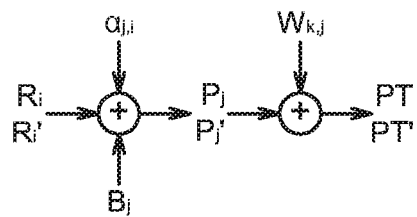
FIG. 3 shows the estimating model for the total loading.

Please refer to FIG. 3. FIG. 3 shows the estimating model for a total loading PT. The total loading PT may be the power consumption or the time consumption. For example, in TBDR, the graphics processing unit includes J hardware components, such as Vertex Data Master (VDM), Pixel Data Master (PDM), Unified Scalable Shader Engine (USSE), tiling coprocessor, pixel coprocessor, texturing coprocessor, texture cache, and main memory.

According to the following equation (1), the total loading PT is the sum of the product of a plurality of weighting coefficients $W_{k,j}$ ($1 \leq j \leq J$) and a plurality of loadings of the hardware components. The subscript "k" indicates the k-th group, the subscript "j" indicates the j-th hardware component. Each group corresponds J weighting coefficients $W_{k,j}$ ($1 \leq j \leq J$).

$$PT = \sum_{\forall j} W_{k,j} \cdot P_j \tag{1}$$

Please refer to table 1. Table 1 shows the relationship between a plurality of reference graphics parameters of each reference graphics application program and the hardware components of the graphics processing unit. The reference graphics parameters can include the general parameter, the geometry parameter, the fragment parameter, and the texture parameter.

The general parameter may include the frame rate. The geometry parameter may include the number of triangles, the number of vertices, the number of batches, the lighting mode, the level-of-detail, the primitive assembly type, the interleaving attributes, the instancing. The fragment parameter may include the resolution, the scissor test/stencil buffer, the alpha test, the anti-aliasing. The texture parameter may include the number of texels, the texture mapping, the texture filtering, the texture compression, and the POT/NPOT.

TABLE 1

| | VDM | PDM | ... | main memory |
|---|---|---|---|---|
| frame rate | X | X | ... | X |
| number of triangles | | | ... | |
| number of batches | X | X | ... | X |
| lighting mode | | | ... | |
| level-of-detail | X | X | ... | X |
| primitive assembly type | X | | ... | X |
| interleaving attributes | | | ... | X |
| Instancing | X | | ... | X |
| . | . | . | | . |
| . | . | . | | . |
| . | . | . | | . |
| texture compression | | | ... | X |
| POT/NPOT | | | ... | |

In table 1, "X" indicates that the reference graphics parameter and the hardware component are highly correlated. As shown in equation (2), there is a relative relationship between each loading $P_j$ and I reference graphics parameters $R_i$ ($1 \leq i \leq I$). In one example, the relative relationship is illustrated by a linear relationship. The subscript "i" indicates the i-th reference graphics parameter.

$$P_j = \sum_{\forall i} \alpha_{j,i} \cdot R_i + \beta_j \tag{2}$$

That is to say, the equation (1) can be substituted by the equation (3). The equation (3) is the estimating model for the total loading PT.

$$PT = \sum_{\forall j} W_{k,j} \cdot P_j \tag{3}$$

$$= \sum_{\forall j} W_{k,j} \cdot \left( \sum_{\forall i} \alpha_{j,i} \cdot R_i + \beta_j \right)$$

As shown in FIG. 3, a total loading PT' of a current graphics application program can be estimated according to the estimating model. Firstly, a plurality of current graphics parameters $R_i'$ ($1 \leq i \leq I$) can be obtained. Then, a plurality of loadings $P_j'$ ($1 \leq j \leq J$) can be calculated according to the slope coefficients $\alpha_{j,i}$ ($1 \leq j \leq J$ and $1 \leq i \leq I$) and the shift coefficients $\beta_j$ ($1 \leq j \leq J$) trained by the relative information unit 140. Afterwards, the current graphics application program is classified to be at least one particular group according to the current graphics application parameters $R_i'$ ($1 \leq i \leq I$), such as the k-th group, and the corresponding weighting coefficients $W_{k',j}$ ($1 \leq j \leq J$) are obtained. Then, the total loading PT' is calculated accordingly.

Figure 4:
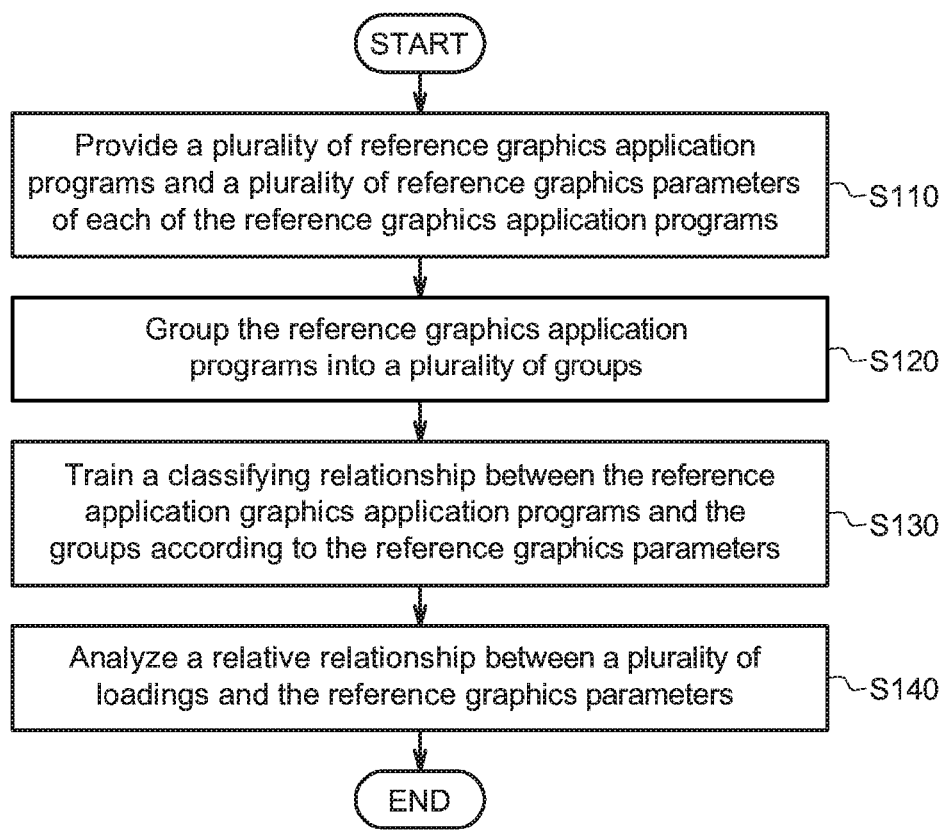
FIG. 4 shows a flowchart of the analyzing method performed in the offline mode according to one embodiment.
Figure 5:
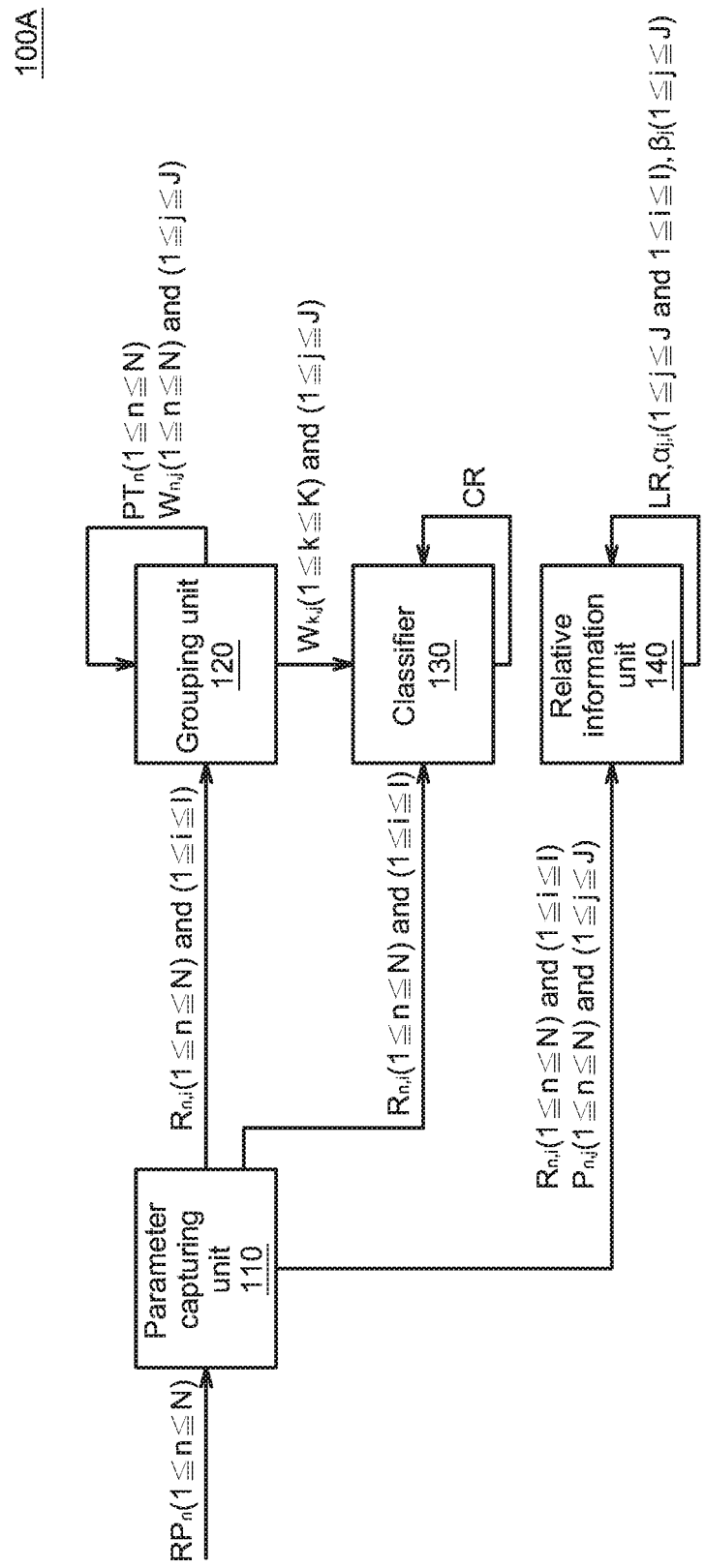
FIG. 5 shows the steps in FIG. 4.

Please refer to FIGS. 4 and 5. FIG. 4 shows a flowchart of the analyzing method performed in the offline mode according to one embodiment. FIG. 5 shows the steps in FIG. 4. In the offline mode, the analyzing method can group the reference graphics application programs into K groups, and create the estimating model for the total loading PT of the graphics processing unit. The analyzing method is illustrated through the analyzing system 100B for analyzing the power consumption. In step S110, the reference graphics application programs $RP_n$ ($1 \le n \le N$) are provided. And, the parameter capturing unit 110 obtains the reference graphics parameters $R_{n,i}$ ($1 \le n \le N$ and $1 \le i \le I$) of each of the reference graphics application programs $RP_n$ ($1 \le n \le N$). In this step, the reference graphics parameters $R_{n,i}$ ($1 \le n \le N$ and $1 \le i \le I$) are captured through the API Trace.

In step S120, the grouping unit 120 groups the reference graphics application programs $RP_n$ ($1 \le n \le N$) into a plurality of groups, such as K groups. In this step, the number of the groups can be predetermined. The total loadings $PT_n$ ($1 \le n \le N$) of the reference graphics application programs $RP_n$ ($1 \le n \le N$) are measured respectively. Then, the weighting coefficients $W_{n,j}$ ($1 \le n \le N$ and $1 \le j \le J$) of the hardware components are obtained respectively. Afterwards, a grouping algorithm, such as a K-means algorithm, is used to group the reference graphics application programs $RP_n$ ($1 \le n \le N$). If some sets of the growth trends of the weighting coefficients $W_{n,j}$ of the reference graphics application programs $RP_n$ ($1 \le n \le N$) are similar, then those reference graphics application programs $RP_n$ are grouped into the same group. In each of the groups, the weighting coefficients $W_{k,j}$ ($1 \le k \le K$ and $1 \le j \le J$) is calculated by linear interpolation. For example, in 30 reference graphics application programs $RP_n$ ($1 \le n \le 30$), the weighting coefficients $W_{n,j}$ ($1 \le n \le 10$ and $1 \le j \le J$) of the first to 10-th reference graphics application programs $RP_n$ ($1 \le n \le 10$) are similar. Therefore, the first to 10-th reference graphics application programs $RP_n$ ($1 \le n \le 10$) are grouped into a first group, and the weighting coefficients $W_{1,j}$ ($1 \le j \le J$) (not shown) of the first group are calculated by linear interpolation. The weighting coefficients $W_{n,j}$ ($11 \le n \le 30$ and $1 \le j \le J$) of the 11-th to 30-th reference graphics application programs $RP_n$ ($11 \le n \le 30$) are similar. Therefore, the 11-th to 30-th reference graphics application programs $RP_n$ ($11 \le n \le 30$) are grouped into a second group, and the weighting coefficients $W_{2,j}$ ($1 \le j \le J$) (not shown) of the second group are calculated by linear interpolation. In the other embodiments, the grouping algorithm can be an Expectation-maximization algorithm, a Highly Connected Subgraphs clustering algorithm, a Connectivity based clustering algorithm, or a hierarchical clustering algorithm.

After grouping, the grouped reference graphics application programs $RP_n$ ($1 \le n \le N$) are used for training. In step S130, the classifier 130 trains a classifying relationship CR between the reference graphics application programs and the groups according to the reference graphics parameters $R_{n,i}$ ($1 \le n \le N$ and $1 \le i \le I$). In this step, the training procedure is performed according a Machine Learning Algorithm, such as an artificial neural network algorithm (ANN algorithm), or a Support Vector Machine algorithm (SVM algorithm). In this step, the classifying relationship CR is not trained according to the information detected from the hardware components. That is to say, when to determine which group the current graphics application program RP' (shown in FIG. 7) belong to, there is no need to detect the hardware components. The current graphics application program RP' can be classified according to the current graphics parameters $R_i'$ ($1 \le i \le I$) (shown in FIG. 7) of the current graphics application program RP'.

In step S140, the relative information unit 140 analyzes a relative relationship, such as a linear relationship LR, between the loadings $P_{n,j}$ ($1 \le n \le N$ and $1 \le j \le J$)) of the reference graphics parameters $R_{n,i}$ ($1 \le n \le N$ and $1 \le i \le I$) to obtain the slope coefficients $\alpha_{j,i}$ ($1 \le j \le J$ and $1 \le i \le I$) and the shift coefficients $\beta_j$ ($1 \le j \le J$). In other embodiments, the relative relationship can be a Polynomial regression relationship, a Logarithmic regression relationship, or an Exponential regression relationship.

The step S140 can be performed before the steps S110 to S130; or, the step S140 and one of the steps S110 to S130 can be performed at the same time. The step S140 does not interfere with the steps S110 to S130.

Figure 6:
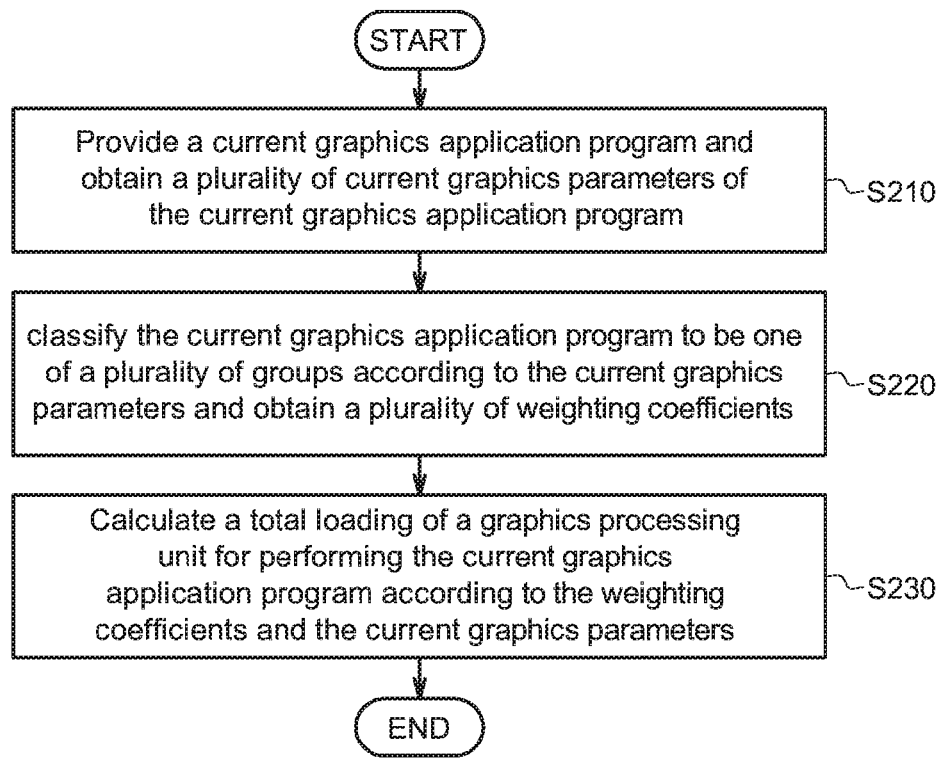
FIG. 6 shows a flowchart of the analyzing method performed in the online mode according to one embodiment.
Figure 7:
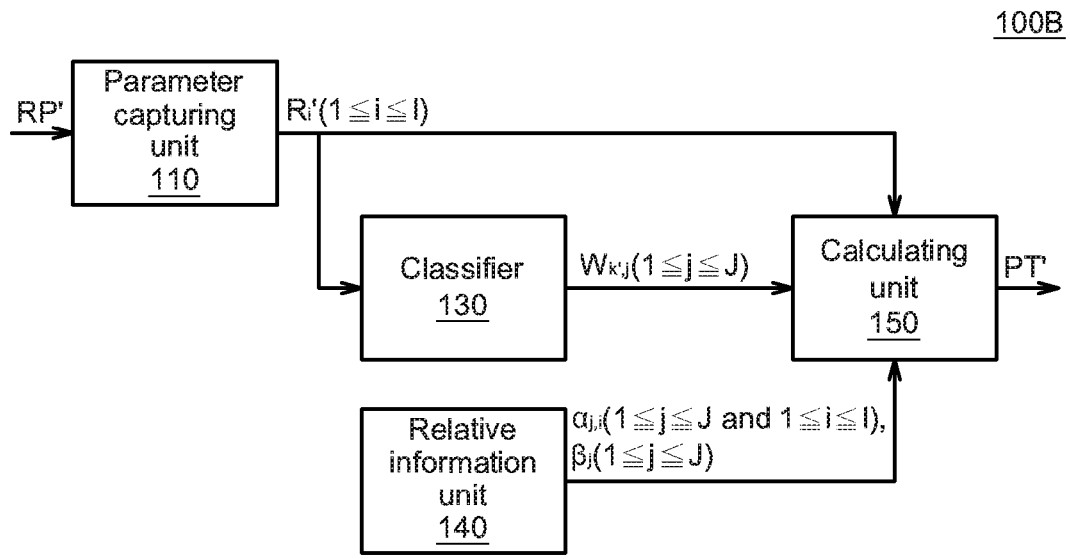
FIG. 7 shows the steps in FIG. 6.

Please refer to FIGS. 6 to 7. FIG. 6 shows a flowchart of the analyzing method performed in the online mode according to one embodiment. FIG. 7 shows the steps in FIG. 6. In the online mode, the analyzing method can classify the current graphics application program RP' to be at least one group and calculate the total loading PT' of the graphics processing unit according to the estimating model. In step S210, the current graphics application program RP' is provided, and the parameter capturing unit 110 obtains the current graphics parameters $R_i'$ ($1 \le i \le I$) of the current graphics application program RP'.

In S220, the classifier 130 classifies the current graphics application program to be at least one of the groups, such as the k'-th group, according to the current graphics parameters $R_i'$ ($1 \le i \le I$), and obtains the weighting coefficients $W_{k',j}$ ($1 \le j \le J$) accordingly. In this step, the input of the current graphics parameters $R_i'$ ($1 \le i \le I$) and the output is at least one group which the current graphics application program RP' belongs to. If the output is only one group, then the weighting coefficients of this group are obtained. If the output is more than one groups, then, in one embodiment, interpolating the weighting coefficients of those groups.

In step S230, the calculating unit 150 calculates the total loading PT' of the graphics processing unit for performing the current graphics application program RP' according to the weighting coefficients $W_{k',j}$ ($1 \le j \le J$), the current graphics parameters $R_i'$ ($1 \le i \le I$), the slope coefficients $\alpha_{j,i}$ ($1 \le j \le J$ and $1 \le i \le I$) the shift coefficients $\beta_j$ ($1 \le j \le J$) via the equation (3).

In one embodiment, the relative relationship can be trained at the offline mode.

In one embodiment, the hardware components of the graphics processing unit performing the current graphics application program are corresponding to the loading individually.

According to the embodiments described above, the graphics parameters are obtained by analyzing the source codes or the API Trace, and the total loading of the graphics processing unit can be calculated accordingly. This method is suitable for the program developer. As such, the program developer can find out the particular block of program codes which causes much power consumption, and improves the program codes accordingly. To obtain graphics parameters, it is no need to detect or simulate the hardware components. And, the obtained graphics parameters are not based on any particular hardware architecture. Therefore, the estimating model can be widely used for any hardware architecture of the graphics processing unit. The analyzing method and the analyzing system have much flexibility and extensibility.

Moreover, in the estimating model, the weighting coefficients can be dynamically selected according to the current graphics application program to adapt to the load imbalance of the hardware components of the graphics processing unit. It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An analyzing method for graphics process, comprising:
   providing a plurality of reference graphics application programs and a plurality of reference graphics parameters of each of the reference graphics application programs;
   grouping the reference graphics application programs based on the reference graphics parameters into a plurality of groups;
   training a classifying relationship between the reference application graphics application programs and the groups according to the reference graphics parameters; and
   analyzing a relative relationship between a plurality of loadings of a plurality of hardware components of a graphic processing unit and the reference graphics parameters by calculating weighting coefficients of each of the groups and the plurality of hardware components;
   wherein the reference graphics parameters include general parameters, geometry parameters, and fragment parameters, the general parameters being different than the geometry parameters and the fragment parameters.

2. The analyzing method for graphics process according to claim 1, wherein in the step of grouping the reference graphics application programs into the groups, the reference graphics application programs are grouped according to a K-means algorithm, an Expectation-maximization algorithm, a Highly Connected Subgraphs clustering algorithm, a Connectivity based clustering algorithm, or a hierarchical clustering algorithm.

3. The analyzing method for graphics process according to claim 1, wherein in the step of training the classifying relationship between the reference graphics application programs and the groups, the classifying relationship is trained according to an artificial neural network algorithm, or a Support Vector Machine algorithm.

4. An analyzing method for graphics process, comprising:
   providing a current graphics application program and obtaining a plurality of current graphics parameters of the current graphics application program;
   classifying the current graphics application program to be at least one of a plurality of groups according to the current graphics parameters of the current graphics application program and obtaining a plurality of weighting coefficients according to the at least one of the plurality of groups and a plurality of hardware components of a graphic processing unit; and
   calculating a total loading of the graphic processing unit for performing the current graphics application program according to the weighting coefficients and the current graphics parameters of the current graphics application program;
   wherein the current graphics parameters include general parameters, geometry parameters and fragment parameters, the general parameters being different than the geometry parameters and the fragment parameters.

5. The analyzing method for graphics process according to claim 4, further comprising:
   providing a plurality of reference graphics application programs and a plurality of reference graphics parameters of each of the reference graphics application programs;
   grouping the reference graphics application programs into the groups; and
   training a classifying relationship between the reference graphics application programs and the groups according to the reference graphics parameters.

6. The analyzing method for graphics process according to claim 5, wherein in the step of grouping the reference graphics application programs into the groups, the reference graphics application programs are grouped according to a K-means algorithm, an Expectation-maximization algorithm, a Highly Connected Subgraphs clustering algorithm, a Connectivity based clustering algorithm, or a hierarchical clustering algorithm.

7. The analyzing method for graphics process according to claim 5, wherein in the step of training the classifying relationship between the reference graphics application programs and the groups, the classifying relationship is trained according to an artificial neural network algorithm, or a Support Vector Machine algorithm.

8. The analyzing method for graphics process according to claim 4, wherein each of the hardware components of the graphics processing unit processes the current graphics application program by a loading, and the total loading is obtained by summing up the loadings of the hardware components according to the weighting coefficients.

9. The analyzing method for graphics process according to claim 8, wherein there is a relative relationship between each of the loadings and the weighting coefficients, and the relative relationship is a linear relationship, a Polynomial regression relationship, a Logarithmic regression relationship, or an Exponential regression relationship.

10. The analyzing method for graphics process according to claim 4, wherein the total loading is a power consumption or a time consumption.

11. An analyzing system for graphics process, comprising:
    a parameter capturing unit, configured to capture a plurality of reference graphics parameters of each of a plurality of reference graphics application programs;
    a grouping unit, configured to group the reference graphics application programs into a plurality of groups based on the reference graphics parameters;
    a classifier, configured to train a classifying relationship between the reference graphics application programs and the groups according to the reference graphics parameters; and
    a relative information unit, configured to analyze a relative relationship between a plurality of loadings of a plurality of hardware components of a graphic processing unit and the reference graphics parameters by calculating weighting coefficients of each of the groups and the plurality of hardware components;
    wherein the reference graphics parameters include general parameters, geometry parameters and fragment parameters, the general parameters being different than the geometry parameters and the fragment parameters.

12. The analyzing system for graphics process according to claim 11, wherein the grouping unit groups the reference graphics application programs according to a K-means algorithm, an Expectation-maximization algorithm, a Highly Connected Subgraphs clustering algorithm, a Connectivity based clustering algorithm, or a hierarchical clustering algorithm.

13. The analyzing system for graphics process according to claim 11, wherein the classifier trains the classifying relationship according to an artificial neural network algorithm, or a Support Vector Machine algorithm.

14. An analyzing system for graphics process, comprising:
- a parameter capturing unit, configured to obtain a plurality of current graphics parameters of a current graphics application program;
- a classifier, configured to classify the current graphics application program to be at least one of a plurality of groups according to the current graphics parameters of the current graphics application program and obtain a plurality of weighting coefficients according to the at least one of the plurality of groups and a plurality of hardware components of a graphic processing unit; and
- a calculating unit, configured to calculate a total loading of the graphics processing unit for performing the current graphics application program according to the weighting coefficients and the current graphics parameters of the current graphics application program;
- wherein the current graphics parameters include general parameters, geometry parameters and fragment parameters, the general parameters being different than the geometry parameters and the fragment parameters.

15. The analyzing system for graphics process according to claim 14, wherein the parameter capturing unit obtains a plurality of reference graphics parameters of each of a plurality of reference graphics application programs, the system further comprises:
- a grouping unit, configured to group the reference graphics application programs into the groups, wherein the classifier trains a classifying relationship between the reference graphics application programs and the groups according to the reference graphics parameters.

16. The analyzing system for graphics process according to claim 15, wherein the grouping unit groups the reference graphics application programs according to a K-means algorithm, an Expectation-maximization algorithm, a Highly Connected Subgraphs clustering algorithm, a Connectivity based clustering algorithm, or a hierarchical clustering algorithm.

17. The analyzing system for graphics process according to claim 15, wherein the classifier trains the classifying relationship according to an artificial neural network algorithm, or a Support Vector Machine algorithm.

18. The analyzing system for graphics process according to claim 14, wherein each of the hardware components of the graphics processing unit processes the current graphics application program by a loading, and the total loading is obtained by summing up the loadings of the hardware components according to the weighting coefficients.

19. The analyzing system for graphics process according to claim 18, further comprising:
- a relative information unit, configured to analyze a relative relationship between each of the loadings and the weighting coefficients, and the relative relationship is a linear relationship, a Polynomial regression relationship, a Logarithmic regression relationship, or an Exponential regression relationship.

20. The analyzing system for graphics process according to claim 14, wherein the total loading is a power consumption or a time consumption.

* * * * *